(12) United States Patent
Liu et al.

(10) Patent No.: US 10,464,137 B2
(45) Date of Patent: Nov. 5, 2019

(54) VERTICAL LATHE CHUCK MOUNTING RACK

(71) Applicant: CITIC Dicastal CO., LTD, Qinhuangdao (CN)

(72) Inventors: Weidong Liu, Qinhuangdao (CN); Yukun Yang, Qinhuangdao (CN); Zhi Chang, Qinhuangdao (CN); Guidong Yang, Qinhuangdao (CN); Yu Chang, Qinhuangdao (CN); Yongwang Zhao, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 208 days.

(21) Appl. No.: 15/605,290

(22) Filed: May 25, 2017

(65) Prior Publication Data

US 2018/0200803 A1 Jul. 19, 2018

(30) Foreign Application Priority Data

Jan. 18, 2017 (CN) .......................... 2017 1 00360439

(51) Int. Cl.
*B23B 5/28* (2006.01)
*B23B 25/00* (2006.01)
*B23B 31/39* (2006.01)
*B66C 13/08* (2006.01)

(52) U.S. Cl.
CPC ............... *B23B 5/28* (2013.01); *B23B 25/00* (2013.01); *B23B 31/39* (2013.01); *B23B 2215/08* (2013.01); *B66C 13/08* (2013.01); *Y10T 82/2511* (2015.01); *Y10T 82/2522* (2015.01); *Y10T 483/171* (2015.01)

(58) Field of Classification Search
CPC .... B23B 5/28; B23B 3/10; B23B 3/08; B23B 5/08; Y10T 82/2511; Y10T 82/2522; Y10T 82/2531; B66C 7/02; B66C 7/08; B66C 7/12; B66C 7/14; B66C 7/16; B66C 9/14; B66C 13/08; B25J 9/023; B25J 5/04
USPC ...................................................... 269/71, 60
See application file for complete search history.

(56) References Cited

U.S. PATENT DOCUMENTS

| | | | | |
|---|---|---|---|---|
| 1,401,954 A | * | 1/1922 | Bliss ....................... | B23Q 35/00 82/110 |
| 1,488,711 A | * | 4/1924 | Rohlfing ................. | B23B 39/00 408/234 |
| 2,991,663 A | * | 7/1961 | McHugh ................. | B23B 39/04 409/80 |
| 3,947,951 A | * | 4/1976 | Jerue .................. | B23Q 3/15773 483/40 |

(Continued)

*Primary Examiner* — Sunil K Singh
*Assistant Examiner* — Yasir A Diab
(74) *Attorney, Agent, or Firm* — Calfee, Halter & Griswold LLP

(57) ABSTRACT

The present application discloses a vertical lathe chuck mounting rack, which is composed of a decelerator A, a motor A, a rack, a motor B, a decelerator B, a linear guide rail C, a ball screw, a cylinder, a guide rail sliding seat C, a flange and the like, wherein the motor A is capable of driving a horizontal rack to move horizontally on a cross beam along a linear guide rail B. The motor B is capable of driving a lifting rack to move vertically along the linear guide rail C. The cylinder is capable of driving a telescopic rack to move horizontally along a linear guide rail A.

1 Claim, 1 Drawing Sheet

(56) References Cited

U.S. PATENT DOCUMENTS

| | | | | |
|---|---|---|---|---|
| 3,966,058 | A * | 6/1976 | Heffron | B23Q 7/043 198/346.2 |
| 4,187,749 | A * | 2/1980 | Webber | B23Q 7/04 414/591 |
| 4,302,144 | A * | 11/1981 | Hallqvist | B23Q 7/04 414/225.01 |
| 5,025,690 | A * | 6/1991 | Myers | B23Q 1/015 82/121 |
| 6,232,736 | B1 * | 5/2001 | Bullen | B23Q 1/012 156/433 |
| 6,651,536 | B1 * | 11/2003 | Binnie | B23B 3/32 82/122 |
| 2010/0242694 | A1 * | 9/2010 | Kitayama | B23B 3/10 82/121 |
| 2010/0288089 | A1 * | 11/2010 | Miyamoto | B23B 5/08 82/118 |
| 2011/0259162 | A1 * | 10/2011 | Nakakubo | B23B 5/28 82/104 |
| 2014/0150243 | A1 * | 6/2014 | Mamczur | B23B 5/28 29/527.4 |

\* cited by examiner

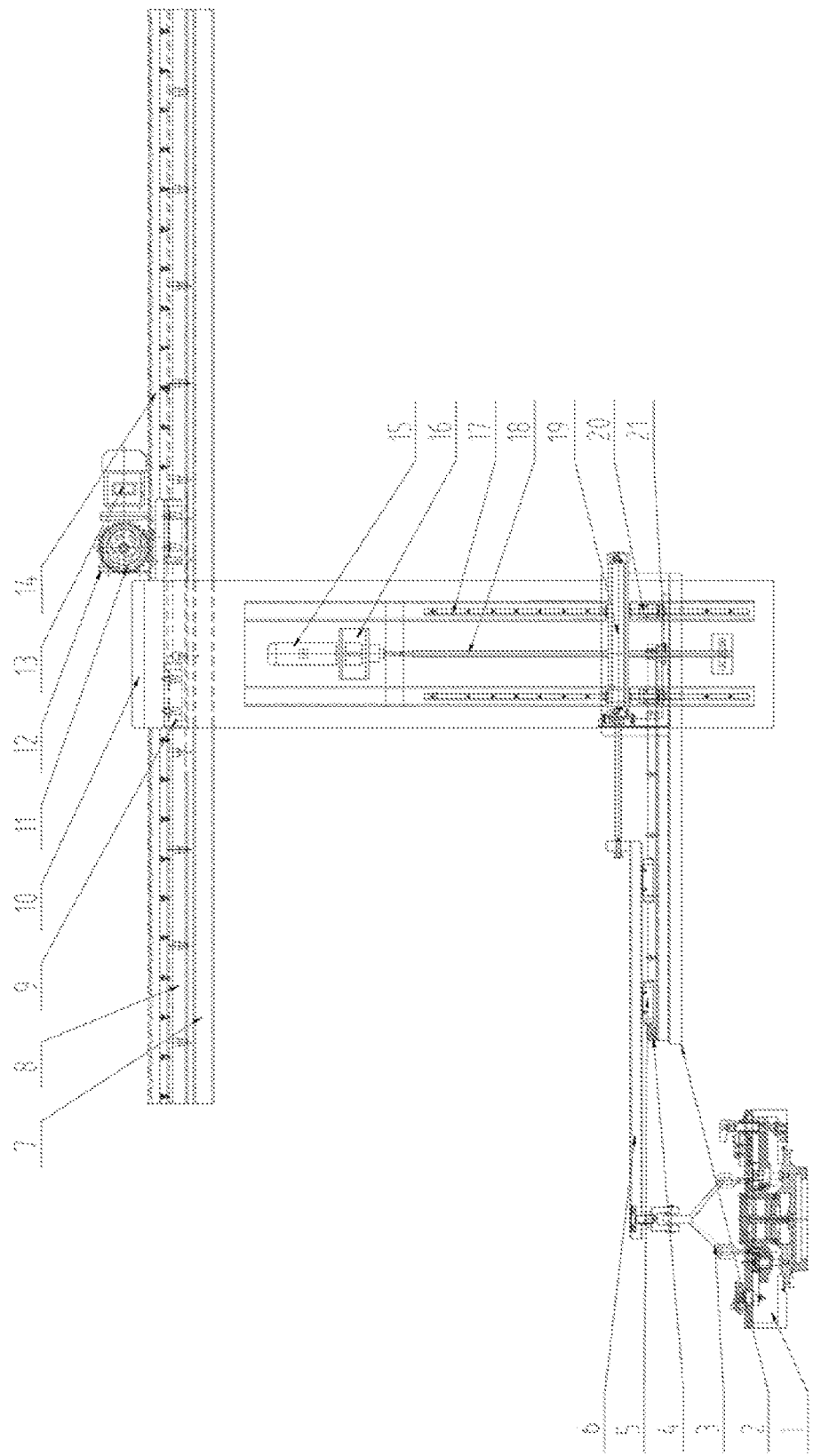

VERTICAL LATHE CHUCK MOUNTING RACK

CROSS-REFERENCE TO RELATED APPLICATIONS

This application claims priority to Chinese Patent Application No. 201710036043.9, filed on Jan. 18, 2017, which is hereby incorporated by reference in its entirety.

TECHNICAL FIELD

The present application relates to a mounting rack, and specifically to a mounting rack for replacing a wheel vertical lathe chuck.

BACKGROUND ART

In the production industry of automobile wheels, due to the multiformity of dimensions and structures of wheels, chucks often need to be replaced when the wheel type is replaced. In consideration of the situation that the internal space of a workshop site unit is small and the limitation of the internal spatial structure of a vertical lathe, a common tool such as a forklift or the like cannot meet the requirement of chuck installation. A chuck in a machining workshop is often manually replaced by a plurality of persons with the help of simple tools, and this method is not only laborious and time-consuming, but also has great potential safety hazards.

SUMMARY OF THE INVENTION

An object of the subject matter is to provide a vertical lathe chuck mounting rack.

In order to achieve the above object, the subject matter adopts the technical solution: a vertical lathe chuck mounting rack comprises a chuck, a lifting rack, a lifting chain, a linear guide rail A, a guide rail sliding seat A, a telescopic rack, a cross beam, a linear guide rail B, a guide rail sliding seat B, a horizontal rack, a gear, a decelerator A, a motor A, a rack, a motor B, a decelerator B, a linear guide rail C, a ball screw, a cylinder, a guide rail sliding seat C and a flange.

The cross beam is fixed on a workshop bearing wall, the rack is fixed on the cross beam, the horizontal rack is installed on the cross beam via the guide rail sliding seat B and the linear guide rail B, the decelerator A and the motor A are installed on the horizontal rack, the gear is installed on an output shaft of the decelerator A, and the gear is engaged with the rack. The motor A is configured to drive the horizontal rack to move horizontally on the cross beam along the linear guide rail B via gear-rack transmission between the gear and the rack.

The motor B, the decelerator B, the ball screw and the linear guide rail C are installed on the horizontal rack, the lifting rack is connected with the guide rail sliding seat C via the linear guide rail C, the flange is installed on the lifting rack, and the ball screw is connected with the decelerator B and the flange. The motor B is configured to drive the lifting rack to move vertically along the linear guide rail C via the cooperation of the ball screw and the flange.

The cylinder and the linear guide rail A are fixed on the lifting rack, the telescopic rack is connected with the linear guide rail A via the guide rail sliding seat A, and the lifting chain is installed on the lifting rack. The cylinder is configured to drive the telescopic rack to move horizontally along the linear guide rail A via the linear guide rail A and the guide rail sliding seat A.

In practical use, firstly, the chuck to be installed is installed on the telescopic rack via the lifting chain; secondly, the motor A is configured to drive the chuck to move horizontally along the linear guide rail B via gear-rack transmission between the gear and the rack, the chuck is finally transferred to the front of a vertical lathe, and the motor B is controlled to adjust the installation height of the chuck; thirdly, compressed air is introduced into the cylinder, and the cylinder drives the lifting rack and the chuck to move to a position above a main shaft of the vertical lathe along the linear guide rail A; fourthly, the chuck is put on the interface of the main shaft of the vertical lathe by controlling the motor B; and finally, the chuck is fixed on the interface of the main shaft of the vertical lathe, and this device is moved out of the unit. So far, the installation of the chuck is completed.

The vertical lathe chuck mounting rack of the subject matter can meet the requirements of chuck transfer and disassembly in use, and has the characteristics of simple structure, working reliability, high turnover precision and the like.

BRIEF DESCRIPTION OF DRAWINGS

FIG. 1 is a structural schematic diagram of a vertical lathe chuck mounting rack of the present application.

In figures: 1—chuck, 2—lifting rack, 3—lifting chain, 4—linear guide rail A, 5—guide rail sliding seat A, 6—telescopic rack, 7—cross beam, 8—linear guide rail B, 9—guide rail sliding seat B, 10—horizontal rack, 11—gear, 12—decelerator A, 13—motor A, 14—rack, 15—motor B, 16—decelerator B, 17—linear guide rail C, 18—ball screw, 19—cylinder, 20—guide rail sliding seat C, 21—flange.

DETAILED DESCRIPTION OF THE INVENTION

Details and working conditions of a specific device provided by the present application will be described in detail below in combination with the accompanying drawing.

A vertical lathe chuck mounting rack of the present embodiment comprises a chuck 1, a lifting rack 2, a lifting chain 3, a linear guide rail A 4, a guide rail sliding seat A 5, a telescopic rack 6, a cross beam 7, a linear guide rail B 8, a guide rail sliding seat B 9, a horizontal rack 10, a gear 11, a decelerator A 12, a motor A 13, a rack 14, a motor B 15, a decelerator B 16, a linear guide rail C 17, a ball screw 18, a cylinder 19, a guide rail sliding seat C 20 and a flange 21.

The cross beam 7 is fixed on a workshop bearing wall, the rack 14 is fixed on the cross beam 7, the horizontal rack 10 is installed on the cross beam 7 via the guide rail sliding seat B 9 and the linear guide rail B 8, the decelerator A 12 and the motor A 13 are installed on the horizontal rack 10, the gear 11 is installed on an output shaft of the decelerator A 12, and the gear 11 is engaged with the rack 14. The motor A 13 is configured to drive the horizontal rack 10 to move horizontally on the cross beam 7 along the linear guide rail B 8 via gear-rack transmission between the gear 11 and the rack 14.

The motor B 15, the decelerator B 16, the ball screw 18 and the linear guide rail C 17 are installed on the horizontal rack 10, the lifting rack 2 is connected with the guide rail sliding seat C 20 via the linear guide rail C 17, the flange 21 is installed on the lifting rack 2, and the ball screw 18 is connected with the decelerator B 16 and the flange 21. The motor B 15 is configured to drive the lifting rack 2 to move vertically along the linear guide rail C 17 via the cooperation of the ball screw 18 and the flange 21.

The cylinder 19 and the linear guide rail A 4 are fixed on the lifting rack 2, the telescopic rack 6 is connected with the linear guide rail A 4 via the guide rail sliding seat A 5, and the lifting chain 3 is installed on the lifting rack 2. The cylinder 19 is configured to drive the telescopic rack 6 to move horizontally along the linear guide rail A 4 via the linear guide rail A 4 and the guide rail sliding seat A 5.

In practical use, firstly, the chuck 1 to be installed is installed on the telescopic rack 6 via the lifting chain 3; secondly, the motor A 13 is capable of driving the chuck 1 to move horizontally along the linear guide rail B 8 via gear-rack transmission between the gear 11 and the rack 14, the chuck 1 is finally transferred to the front of a vertical lathe, and the motor B 15 is controlled to adjust the installation height of the chuck 1; thirdly, compressed air is introduced, and the cylinder 19 drives the lifting rack 2 and the chuck 1 to move to a position above a main shaft of the vertical lathe along the linear guide rail A 4; fourthly, the chuck 1 is put on the interface of the main shaft of the vertical lathe by controlling the motor B 15; and finally, the chuck 1 is fixed on the interface of the main shaft of the vertical lathe, and this device is moved out of the unit. So far, the installation of the chuck 1 is completed. The vertical lathe chuck mounting rack of present application may meet the requirements of chuck transfer and disassembly in use, and has the characteristics of simple structure, working reliability, high turnover precision and the like.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vertical lathe chuck mounting rack to install a chuck on an interface of a main shaft of a vertical lathe, comprising a chuck, a lifting rack, a lifting chain, a first linear guide rail, a first guide rail sliding seat, a telescopic rack, a cross beam, a second linear guide rail, a second guide rail sliding seat, a horizontal rack, a gear, a first decelerator, a first motor, a rack, a second motor, a second decelerator, a third linear guide rail, a ball screw, a cylinder, a third guide rail sliding seat and a flange, wherein the cross beam is fixed on a workshop bearing wall, the rack is fixed on the cross beam, the horizontal rack is installed on the cross beam via the second guide rail sliding seat and the second linear guide rail, the first decelerator and the first motor are installed on the horizontal rack, the gear is installed on an output shaft of the first decelerator, and the gear is engaged with the rack; the first motor is configured to drive the horizontal rack to move horizontally on the cross beam along the second linear guide rail via gear-rack transmission between the gear and the rack;

the second motor, the second decelerator, the ball screw and the third linear guide rail are fixed on the horizontal rack, the lifting rack is connected with the third guide rail sliding seat via the third linear guide rail, the flange is installed on the lifting rack, and the ball screw is connected with the second decelerator and the flange; the second motor is configured to drive the lifting rack to move vertically along the third linear guide rail via the cooperation of the ball screw and the flange;

the cylinder and the first linear guide rail are fixed on the lifting rack, the telescopic rack is connected with the first linear guide rail via the first guide rail sliding seat, and the lifting chain is installed on the lifting rack; the cylinder is configured to drive the telescopic rack to move horizontally along the first linear guide rail via the first linear guide rail and the first guide rail sliding seat, wherein the chuck to be installed is installed on the telescopic rack via the lifting chain, wherein the first motor is configured to drive the chuck to move horizontally along the second linear guide rail via gear-rack transmission between the gear and the rack, such that the chuck is transferred to the front of the vertical lathe, and the second motor is controlled to adjust the installation height of the chuck, wherein compressed air is introduced into the cylinder, and the cylinder drives the lifting rack and the chuck to move to a position above the main shaft of the vertical lathe along the first linear guide rail, wherein the chuck is put on the interface of the main shaft of the vertical lathe by controlling the second motor such that the chuck is fixed on the interface of the main shaft of the vertical lathe, and thereafter the vertical lathe chuck mounting rack is moved out of the vertical lathe, so the installation of the chuck is completed.

* * * * *